United States Patent [19]
Hellerich

[11] 3,854,347
[45] Dec. 17, 1974

[54] DYNAMIC BALANCING DEVICE FOR A COMPUTER DISC MEMORY

[76] Inventor: Joseph Hellerich, 611 W. Belmont, Redwood City, Calif. 94061

[22] Filed: Aug. 15, 1973

[21] Appl. No.: 388,450

[52] U.S. Cl. .................................... 74/573, 360/137
[51] Int. Cl. ............................................. F16f 15/22
[58] Field of Search .................... 74/573; 301/5 BA; 340/174.1 C; 360/133, 137

[56] References Cited

UNITED STATES PATENTS 3,006,690 10/1961 Pierce .............................. 301/5 BA
3,462,198 8/1969 Onufer ............................. 74/573 X
3,464,738 9/1969 Pierce ............................. 74/573 X

OTHER PUBLICATIONS

IBM Model 2311 Disk Storage Drive Manual, Page 3.

*Primary Examiner*—Benjamin W. Wyche
*Assistant Examiner*—F. D. Shoemaker
*Attorney, Agent, or Firm*—Limbach, Limbach & Sutton

[57] ABSTRACT

A plurality of small, round, heavy balls are enclosed within a continuous, hollow, annular tube and the tube is attached to a rotary disc pack memory near the trim shield to the upper or lower clamp rings or to other areas of the rotary disc pack memory to dynamically balance it.

8 Claims, 5 Drawing Figures

DYNAMIC BALANCING DEVICE FOR A COMPUTER DISC MEMORY

BACKGROUND OF THE INVENTION

The present invention relates to a computer disc memory and more particularly to a dynamic balancing device for a rotary disc pack memory.

Magnetically coated discs which are supported in a rotatable structure to form a disc pack are turned at high speeds by a disc drive mechanism to provide a memory function for a computer system. Vibration due to imbalance in the disc pack in a serious problem at such high rotational speeds because the magnetic transducer heads are aerodynamically "floated" on the memory disc surface on a thin layer of air. Even light vibrations caused by such imbalances may result in expensive "crashes" of the magnetic transducer heads on the magnetic recording surfaces of the memory discs, thereby destroying them.

Presently such rotary disc packs are balanced during their manufacture by individually attaching adhesive backed lead weights to the disc pack structure in order to achieve a dynamic balance. Because of the precision required, this process requires a great deal of time and thus raises the cost of the disc packs. Another disadvantage of this procedure is that such weights are apt to fly off, presenting a hazard to technicians working with the memory disc pack.

The present invention overcomes these and other disadvantages by a novel design which additionally simplifies the manufacturing process of such disc pack memory systems.

SUMMARY OF THE INVENTION

A preferred embodiment of the present invention comprises a dynamic balancer for a rotary disc pack memory of a computer, and includes a continuous support secured to the disc pack memory structure so as to rotate with it, the annular support having an annular cavity which is coaxial with the rotary disc pack memory, and mass members supported within the annular cavity. The relative cross-sectional diameters of the mass members and the annular cavity are such that the mass members are freely movable within the annular cavity in a circular direction about the axis of rotation of the memory disc pack. Together the annular support and the mass members constitute a dynamic balancing ring. The dynamic balancing ring is substantially centered about the axis of rotation of the rotary disc pack.

In the preferred embodiments, the annular support comprises a hollow tube. In one embodiment, the annular cavity has a circular cross-section. In another embodiment, the annular cavity has a generally rectangular cross-sectional configuration and in still another embodiment the cross-sectional configuration of the cavity is oval-shaped. In the preferred embodiment, one or more of these dynamic balancing rings is affixed to the rotary disc pack at the upper or lower rings which clamp the memory discs together with spacer rings in a stack.

When the disc pack is rotated, the mass members move within the cavity in the annular support to a rotational position which tends to dynamically balance the complete structure. The theory upon which the dynamic balancing device operates is well known to those skilled in the mechanical vibration art and, therefore, will not be discussed in this application.

One advantage of the present invention is that the rotary disc pack memory is automatically balanced and thus there is a great saving in manufacturing time and cost over prior art methods. Another advantage is that a rotary disc pack fitted with a dynamic balancing device according to the present invention does not have to be rebalanced each time the rotary disc pack is disassembled. Still another advantage of the present invention is that because the movable mass members are contained within the annular support there is relatively no danger of the mass members flying out of the rotating disc memory and so it does not present a danger to the technicians operating it.

It is, therefore, an object of the present invention to provide an automatic dynamic balancer for a rotating disc memory of a computer.

It is another object of the invention to provide a dynamic balancer for a disc memory of a computer which does not present a danger to its operators from flying balancing weights.

The foregoing and other objectives, features and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figures 1, 5:
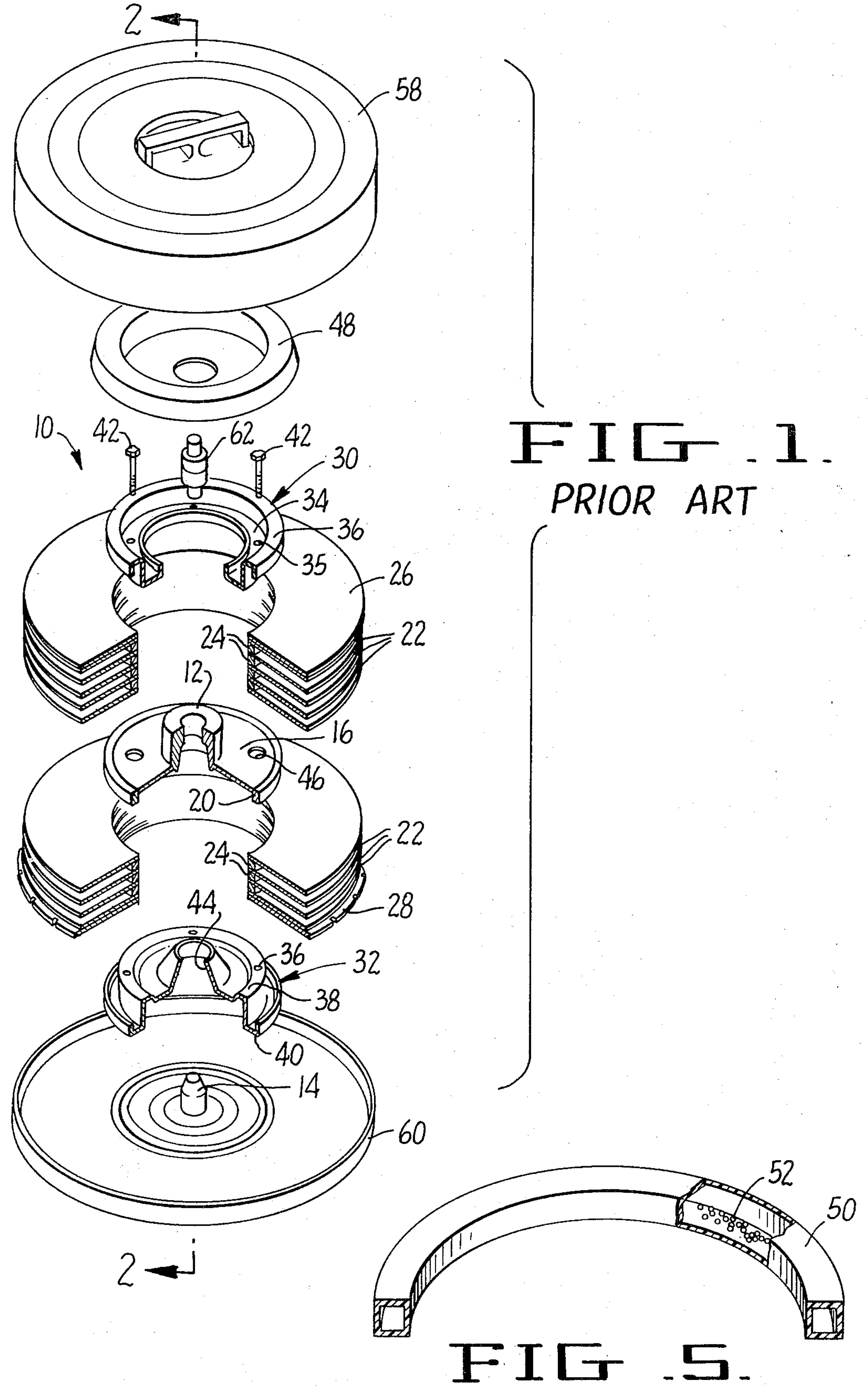
FIG. 1 PRIOR ART, FIG. 5
FIG. 1 is an exploded and partially sectioned perspective view of a rotatable disc memory pack for a computer prior to the insertion of the dynamic balancing devices according to the invention.
FIG. 5 is a sectioned perspective view of a dynamic balancing device according to one embodiment of the invention.
Figure 2:
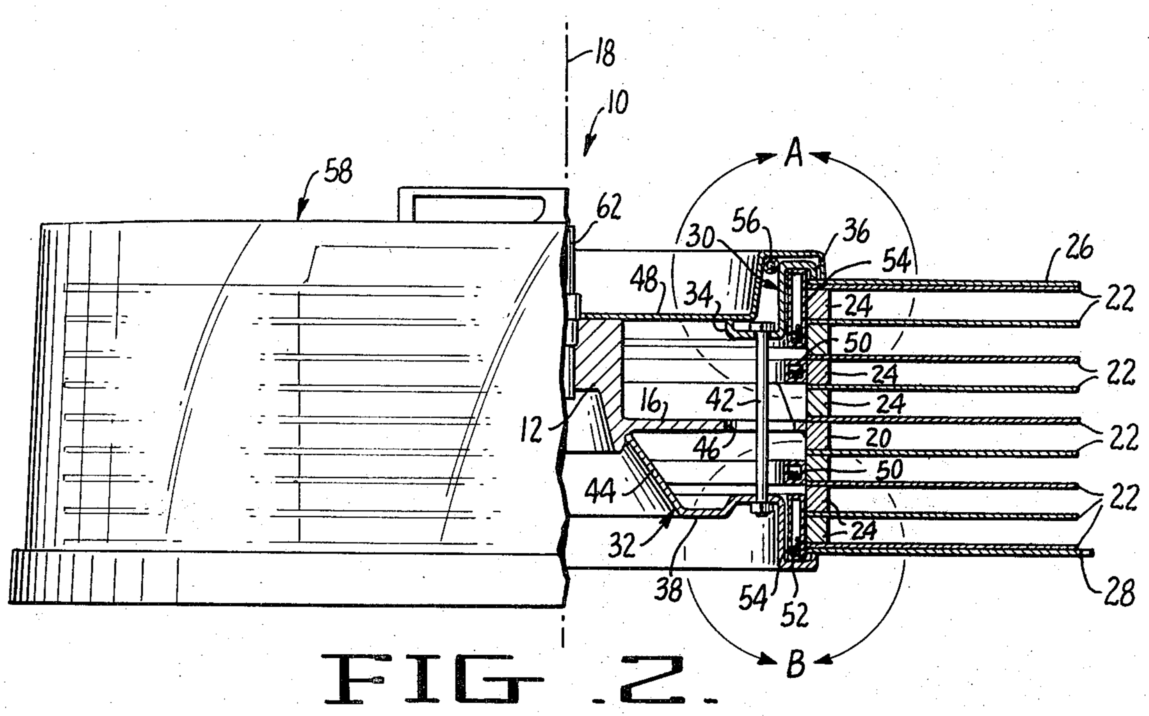
FIG. 2 is a partially sectioned side view of the disc pack memory of FIG. 1 when supplied with dynamic balancing devices according to the invention.

Referring now more particularly to FIGS. 1 and 2, a disc pack assembly 10 is illustrated as comprising a hub 12 adapted to be turned by a disc drive shaft 14 of a computer (not shown). The hub 12 at its lower, peripheral edge has a flange 16 which extends radially outwardly with respect to an axis 18 about which the hub 12 is rotated by a disc pack drive shaft 14. The flange 16 has an annular spacer ring 20 attached to its outer peripheral edge.

The disc pack memory is assembled by placing a first memory disc 22, which has a center hole whose inner edge coincides with the inner edge of the spacer ring 20, on top of the spacer ring 20. The memory disc 22 is centered with the spacer ring 20 and a second ring 24 is then placed on top of the memory disc 22. The spacer ring 24 is substantially the same in size and shape as the spacer ring 20. This construction of a memory disc 22 followed by a spacer ring 24 is repeated until there are a plurality of memory discs and spacer rings stacked on the hub 12. The process is also repeated by placing in sequence a memory disc 22 followed by a spacer ring 24 underneath the spacer ring 20 until the desired member of memory discs 22 and spacer rings 24 are stacked beneath the spacer ring 20. The number of memory discs 22 and spacer rings 24 is a matter of design.

The topmost memory disc 22, as viewed in FIG. 2, has a magnetic oxide recording surfacing only on its underside because it is covered by a protective disc 26. The undersurface of the bottommost memory disc 22, as viewed in FIG. 1, is covered by a sector disc 28 which protects it. The sector disc has a diameter slightly larger than the memory disc and has sector notches cut at radially spaced intervals about its outer peripheral edge. The purpose of these sector notches is well known to those skilled in the memory disc art and does not concern the present intention.

Figure 3:
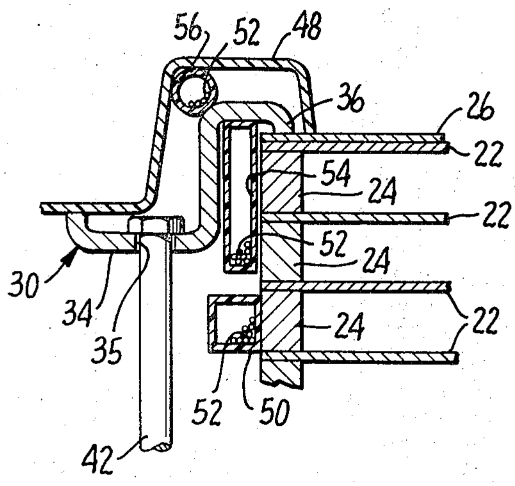
FIG. 3 is an enlarged view of detail A of FIG. 2.
Figure 4:
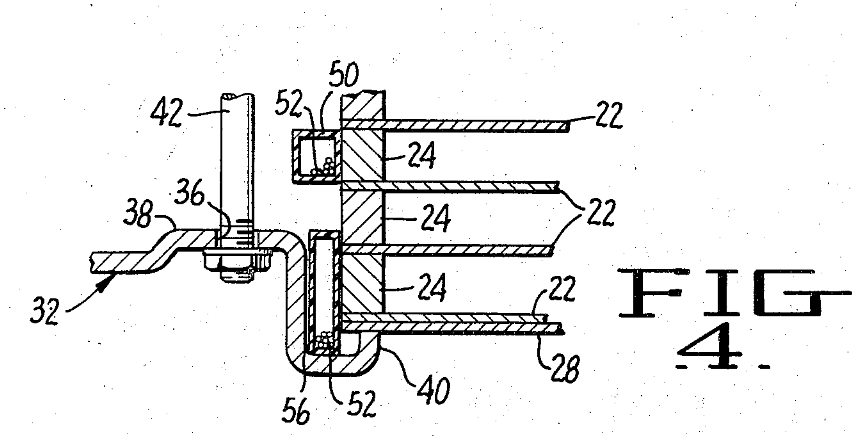
FIG. 4 is an enlarged view of detail B in FIG. 2.

Once the stack of memory discs and spacer rings is arranged on the hub 12, the stack is fixed in place by upper and lower clamp rings 30 and 32, respectively. The upper clamp ring 30 is annularly shaped and has a relatively flat and horizontal portion 34, as best viewed in FIG. 3, and an inverted channel shaped, outer peripheral edge 36. The channel shaped edge 36 bears against the top surface of the protective plate 26 in alignment with the next adjacent spacer ring 24. Similarly, the bottom clamp ring 32 has an outer horizontal portion 38 which is connected to an up-turned, channel shaped, outer peripheral edge 40, as best viewed in FIG. 4. The edge 40 bears against the bottom surface of the sector disc 28 in alignment with the bottommost spacer ring 24.

A plurality of radially spaced bolts 42 passing through holes 35 and 36 in the flat portions 34 and 38 of the clamp rings 30 and 32, respectively, exert a compressive force upon the stack of memory discs 22 and the spacer rings 24. The lower clamp ring 32 has an upwardly extending portion 44, as viewed in FIG. 2, which abuts against the lower edge of the hub 12 to help secure the memory disc stack in place. The bolts 42 pass through holes 46 in the flange 16 of the hub.

The topmost portion of the memory disc stack is fitted with a trim shield 48 which extends from the center of the axis of rotation out to slightly beyond the channel shaped edge 36 of the clamp ring 30. The outer edge of the trim shield has an inverted channel shape which covers the channel shaped outer edge 36 of the clamp ring 30, but is spaced from it.

Referring now more particularly to FIGS. 2–5, in order to balance the memory disc pack described above, one or more dynamic balancing rings are inserted into the stack during its assembly. More specifically, a continuous, hollow, annular support, which in the embodiments depicted in FIGS. 2–5 is a tube 50 whose internal cavity has a substantially square-shaped cross-section, is inserted within the hollow of the disc pack so as to abut against one of the spacer rings 24 around its internal peripheral edge. The tube 50 is continuous and encloses a plurality of mass members 52 which may be, for example, spherical in shape. The tube 50 and the mass members 52 must be made of non-magnetic materials in order to not interfere with the magnetic properties of the memory discs 22. Therefore, in one preferred embodiment, the mass members 52 are made of non-magnetic stainless steel while in other embodiments they are made of lead. The tube 50 is preferably made of a non-metallic, plastic material which will not disturb the alignment of the stack of memory discs and spacer rings. The mass members 52 are free to move within the hollow of the tube 50 and thus are free to locate at any point which will compensate for rotational eccentricity caused by imbalance of the complete disc pack.

The location of the tube 50 is primarily a matter of design and depends upon the particular configuration of the disc pack itself. As illustrated in FIG. 2, a pair of cross-sectionally square-shaped balancing rings 50 are located intermediate the clamp rings 30 and 32.

By having dynamic balancing rings of different shaped cross-sectional areas, they may be placed in other locations in the disc pack. For example, a balancing ring 54 made of a tube of non-magnetic material, which is annular in shape and has a generally rectangular cross-sectional configuration is fitted between the upper spacer rings 24 and the interior of the channel shaped edge 36 of the top clamp ring 30. The ring 54 is also supplied with mass members 52 which are free to move about the axis of rotation 18 in the cavity of the ring 54. Another balancing ring 54 of substantially the same construction is optionally located between the interior surface of the lowermost spacer ring 24 and the channel shaped outer edge 40 of the bottom clamp ring 32.

Still another location for a dynamic balancing ring of a different configuration is between the trim shield 48 and the upper clamp ring 30. An annular ring 56 having a cavity with a substantially circularly shaped cross-section is provided between the trim shield 48 and the upper surface of the clamp ring 30 and adjacent to the outer peripheral edge 36 of the clamp ring 30. As with the dynamic balancing rings 50 and 54, the balancing ring 56 also contains non-magnetic mass members 52 within its cavity which are free to move to dynamically balance the disc pack when it is rotated.

The complete disc pack assembly is enclosed within a pair of upper and lower dust covers 58 and 60, respectively, as viewed in FIG. 1. The assembly is locked in place by a spindle lock 62 which passes through the center of the hub 12.

while in the above described embodiment, certain locations for the dynamic balancing rings of specific cross-sectional shapes have been specified, it will be apparent to those skilled in the art that dynamic balancing rings of other cross-sectional shapes, such as an oval shape, for example, may be located in other positions in other embodiments depending upon the specific design of the disc pack assembly. In all such embodiments, the dynamic balancing rings are made of a non-magnetic, non-metallic material which will not interfere with the delicate alignment of the memory discs 22 and spacing rings 24 in relation to the hub 12. Preferably the dynamic balancing rings are affixed to the disc pack assembly by an adhesive material although in some embodiments they may be made of a material which is slightly resilient so as to maintain a light frictional force against the disc pack assembly so that they will rotate with it. In all embodiments, the dynamic balancing rings are located in planes which are substantially perpendicular to the axis of rotation 18 of the memory discs 22.

Furthermore, although the annular support for the mass members in the above embodiments is described as advantageously being a continuous tube, in other embodiments the annular support may less advantageously be in the form of annular grooves formed in the clamp rings 30 and 32, for example.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A dynamic balancer for use in a computer disc memory of the type having a plurality of memory discs, each disc having a center hole, support means for rotating the discs about a common axis, the support means including a plurality of spacer rings for separating the discs, top and bottom clamp rings for clamping the discs and the sapcer rings in a stack which is generally centered about the common axis, and a hub generally centered on the common axis within the center holes of the memory discs and having a flange attached to at least one of the spacer rings, the dynamic balancer comprising an annular support positioned within the center hole of, at least, one of the discs and exterior of the hub, the annular support having an annular cavity which encircles the common axis, and mass members which are contained by and freely movable within the annular support cavity.

2. A dynamic balancer for use in a computer disc memory as recited in claim 1 wherein the annular support is adjacent and attached to at least one of the spacer rings.

3. A dynamic balancer for use in a computer disc memory as recited in claim 1 wherein at least one of the top and bottom clamp rings has a channel shaped outer peripheral edge which together with one of the spacer rings next adjacent to the one of the top and bottom clamp rings partially defines an annular space about the common axis, the cross-sectional area of the annular support cavity having generally the same shape as the shape of the cross-sectional area of the partially defined annular space.

4. A dynamic balancer for use in a computer disc memory as recited in claim 3 wherein both the annular support and the mass members are made of non-magnetic materials.

5. A dynamic balancer for use in a computer disc memory as recited in claim 3 wherein the annular support is a closed, hollow tube and the mass members are spherical in shape.

6. A method of dynamically balancing a computer disc memory of the type having a plurality of memory discs, each disc having a center hole, support means for rotating the discs about a common axis, the support means including a plurality of spacer rings for separating the discs, top and bottom clamp rings for clamping the discs and the spacer rings in a stack which is generally centered about the common axis, and a hub generally centered on the common axis within the center holes of the memory discs and having a flange attached to at least one of the spacer rings, the dynamic balancing method comprising the steps of inserting mass members in a hollow annular support so that they are freely movable within the annular support, and positioning the annular support within the center hole of, at least, one of the discs and exterior of the hub, and encircling the common axis.

7. A method of dynamically balancing a computer disc memory as recited in claim 6 wherein the step of positioning the annular support includes the step of attaching the annular support adjacent to at least one of the spacer rings.

8. A method of assembling a dynamically balanced computer disc memory of the type having a plurality of memory discs, each disc having a center hole, support means for rotating the discs about a common axis and including a plurality of spacer rings for separating the discs, and a hub generally centered on the common axis within the center holes of the memory discs and having a flange attached to at least one of the spacer rings, the assembly method comprising the steps of inserting mass members within a hollow, annular support so that they are freely movable within the hollow, annular support, clamping the discs and the spacer rings in a stack which is generally centered about the common axis, at least one of the top and bottom clamp rings having a channel shaped outer peripheral edge which together with one of the spacer rings next adjacent to the one of the top and bottom clamp rings partially defines an annular space about the common axis, and inserting the hollow, annular support within the annular space simultaneously with the step of clamping the discs and spacer rings in a stack.

* * * * *